US008520926B2

(12) United States Patent
Schilling

(10) Patent No.: US 8,520,926 B2
(45) Date of Patent: Aug. 27, 2013

(54) METHOD FOR PROCESSING IMAGE AND VOLUME DATA BASED ON STATISTICAL MODELS

(75) Inventor: Andreas Schilling, Gomaringen (DE)

(73) Assignee: Andreas Schilling, Gomaringen (DE)

( * ) Notice: Subject to any disclaimer, the term of this patent is extended or adjusted under 35 U.S.C. 154(b) by 1126 days.

(21) Appl. No.: 11/911,453

(22) PCT Filed: Apr. 12, 2006

(86) PCT No.: PCT/EP2006/003371
§ 371 (c)(1),
(2), (4) Date: Jun. 27, 2008

(87) PCT Pub. No.: WO2006/108633
PCT Pub. Date: Oct. 19, 2006

(65) Prior Publication Data
US 2009/0010506 A1 Jan. 8, 2009

(30) Foreign Application Priority Data
Apr. 12, 2005 (DE) .......................... 10 2005 016 955

(51) Int. Cl.
*G06K 9/00* (2006.01)
(52) U.S. Cl.
USPC ............................. 382/131; 382/132; 382/154
(58) Field of Classification Search
USPC .......................................... 382/128–132, 154
See application file for complete search history.

(56) References Cited

U.S. PATENT DOCUMENTS

| 6,272,370 | B1 * | 8/2001 | Gillies et al. | 600/411 |
| 2002/0077537 | A1 * | 6/2002 | Avrin et al. | 600/409 |
| 2005/0101855 | A1 * | 5/2005 | Miga et al. | 600/407 |

FOREIGN PATENT DOCUMENTS

WO   WO 2004/036500 A2   4/2004

OTHER PUBLICATIONS

Dumpuri et al "Model-Updated Image Guidance: A Statistical Approach" Lecture Notes in Computer Science: Medical Image Computing and Computer-Assisted Intervention-MiCCAI 2003, vol. 2879, Part I, pp. 375-382.*
Hill, A. et al. "Model-Based Interpretation of 3D Medical Images" Proceedings of the British Machine Vision Conference, Sep. 23, 1993, XP008068357, University of Surrey, Guildford.
Lötjönen, J. et al. "Statistical Shape Model of Atria, Ventricles and Epicardium From Short- and Long-Axis MR Images" Medical Image Analysis, Oxford University Press, Oxford, GB, vol. 8, No. 3, Sep. 2004, pp. 371-386.
Cootes T F et al. "Active Shape Models—Their Training and Application" Computer Vision and Image Understanding, Academic Press, US, vol. 61, No. 1, Jan. 1995, pp. 38-59, XP-000978654.

(Continued)

*Primary Examiner* — Jingge Wu
(74) *Attorney, Agent, or Firm* — Crowell & Moring LLP

(57) ABSTRACT

A method for visually displaying and/or evaluating measurement data from imaging methods involve the following acts: a) calculating a parameterized statistical model from example voxel data sets that map different objects of an identical object class; b) carrying out at least one imaging method on an object to be examined of the object class in order to extract real measurement data; c) setting a set of model parameters of the parameterized statistical model; d) determining a difference between the real measurement data and the parameterized statistical model; e) repeating steps c) and d) while changing the model parameters until the difference between the real measurement data and the parameterized statistical model is minimal; and f) visually displaying and/or evaluating the statistical model parameterized in aforementioned manner.

22 Claims, 2 Drawing Sheets

(56) References Cited

OTHER PUBLICATIONS

Cootes T F et al. "Use of Active Shape Models for Locating Structures in Medical Images" Image and Vision Computing, Guildford, GB, vol. 12, No. 6, Aug. 1994, pp. 355-365, XP009020099.

Fleck, S et al. "Direct Estimation of Pose and Illumination—An Analysis by Synthesis Approach" Proceedings of the $7^{TH}$ Tubingen Perception Conference, Feb. 1, 2004, pp. 66-66, XP007901057.

Schilling, A, "Introduction to Analysis by Synthesis Methods" Proceedings of the $8^{TH}$ Tubingen Perception Conference, Computer Vision and Perception, Feb. 27, 2005, pp. 22-22, XP007901058.

International Search Report dated Sep. 14, 2006 with English translation (Eight (8) pages).

http://en.wikipedia.org/wiki/Voxel (5 pages), retrieved on Oct. 3, 2012.

http://gravis.cs.unibas.ch/publications/Sigg99/siggraph99.mpg, viewed on Oct. 3, 2012.

* cited by examiner

METHOD FOR PROCESSING IMAGE AND VOLUME DATA BASED ON STATISTICAL MODELS

BACKGROUND AND SUMMARY OF THE INVENTION

Various imaging methods are available in the medical field for visually displaying the inner structures of bodies being investigated. X-ray imaging, which provides a two-dimensional image of the irradiated structures, has existed for quite some time. Other methods, such as computerized tomography (CT) or magnetic resonance (MR) tomography are also able to provide three-dimensional voxel data sets. The term "voxel" is a combination of the words "volumetric" and "pixel." In a spatial voxel data set present in discretized form in Cartesian coordinates, a voxel corresponds to an associated discrete value on an XYZ coordinate of the data set. A voxel is thus a three-dimensional equivalent of a pixel. The data contained in a voxel data set are usually scalar variables, for example intensity values or color values, which are determined using volume graphic means for visual imaging.

However, these latter-referenced methods are still costly and time-consuming, or (for CT) also involve high radiation exposure levels. For this reason standard two-dimensional X-ray imaging is often used, even when, in surgical planning, for example, three-dimensional imaging would be desirable. Although these images do not provide depth information, experienced medical specialists are able to visualize the imaged three-dimensional structures.

The object of the invention is to provide a method for visually displaying and/or evaluating measurement data from imaging methods, which allows the measured data to be efficiently evaluated and, in particular, enables volume models to be calculated from the measurement data from two-dimensional recordings.

According to the invention, the method comprises the following steps: a) calculating a parameterized statistical model from example voxel data sets that map different objects of an identical object class; b) carrying out at least one imaging method on an object to be examined of the object class in order to extract actual measurement data; c) adjusting a set of model parameters of the parameterized statistical model; d) determining a difference between the actual measurement data and the parameterized statistical model; e) repeating steps c) and d) while changing the model parameters until the difference between the actual measurement data and the parameterized statistical model is minimal, and f) visually displaying and/or evaluating the statistical model parameterized in said manner. Steps a) through f) are preferably carried out in the referenced sequence.

In other words, in the method for processing measurement data from imaging methods a parameterized statistical model is calculated from example voxel data sets in such a way that data calculated from the model optimally match the measured data, and the model thus obtained is outputted for visual display or further processing.

The method according to the invention allows, among other things, the calculation of volume models from two-dimensional pictures (e.g., X-ray pictures or individual tomographs, for example) by calculating, by use of a statistical model created from example data sets, the most probable configuration which could have resulted in the picture. In this case, statistical information obtained from the example data corresponds to the experience of the medical specialist, who is able to visualize a three-dimensional configuration which has resulted in a given picture. Corresponding techniques have heretofore been used only in the field of modeling of two-dimensional images (T. F. Cootes, G. J. Edwards, and C. J. Taylor. Active appearance models. In Burkhardt and Neumann, editors, Computer Vision—ECCV'98 Vol. II, Freiburg, Germany, 1998. Springer, Lecture Notes in Computer Science 1407) or three-dimensional surface models (morphable models (V. Blanz, T. Vetter. Method and device for the processing of images based on morphable models, EP1039417)), but not for volume models.

One refinement of the method includes the following steps: c1) calculating virtual measurement data from the parameterized statistical model, and d1) determining the difference between the actual measurement data and the parameterized statistical model by determining a difference between the actual measurement data and the virtual measurement data. Step c1) is preferably carried out after step c) and before step d), and step d1) is preferably carried out after step d) and before step e).

In one refinement of the method, the example voxel data sets are extracted from CT and/or MR voxel data.

In one refinement of the method, the actual measurement data are extracted on the basis of one or more X-ray pictures.

In one refinement of the method, the actual measurement data are extracted from not yet back-projected data from one or more CT and/or MR images.

In one refinement of the method, the actual measurement data are extracted from voxel data, for example back-projected data from one or more CT and/or MR images.

In one refinement of the method, from the parameterized statistical model a reference data set is calculated which registers the measurement data with the reference data set, and model parameters are calculated which best represent the model which matches the measurement data.

In one refinement of the method, the parameterized statistical model is obtained from a linear combination of example vectors, a respective example vector being assigned to an associated example voxel data set, and components of the respective example vector describing the position and intensity of volume elements of the associated example voxel data set. The example vectors are determined on the basis of the example voxel data sets. Reparameterization as well as parameter reduction may be performed to determine or calculate the example vectors.

In one refinement of the method, a vector space defined by the example vectors is reparameterized.

In one refinement of the method, the evaluation of the parameterized statistical model in step f) includes detection of anomalies in the actual measurement data.

The method according to the invention or certain substeps of the method may preferably be carried out on specialized hardware, for example on the basis of programmable logical units.

BRIEF DESCRIPTION OF THE DRAWINGS

The invention is described below on the basis of typical application scenarios, with reference to the accompanying drawings which schematically show the following.

DETAILED DESCRIPTION OF THE DRAWINGS

Figure 1:
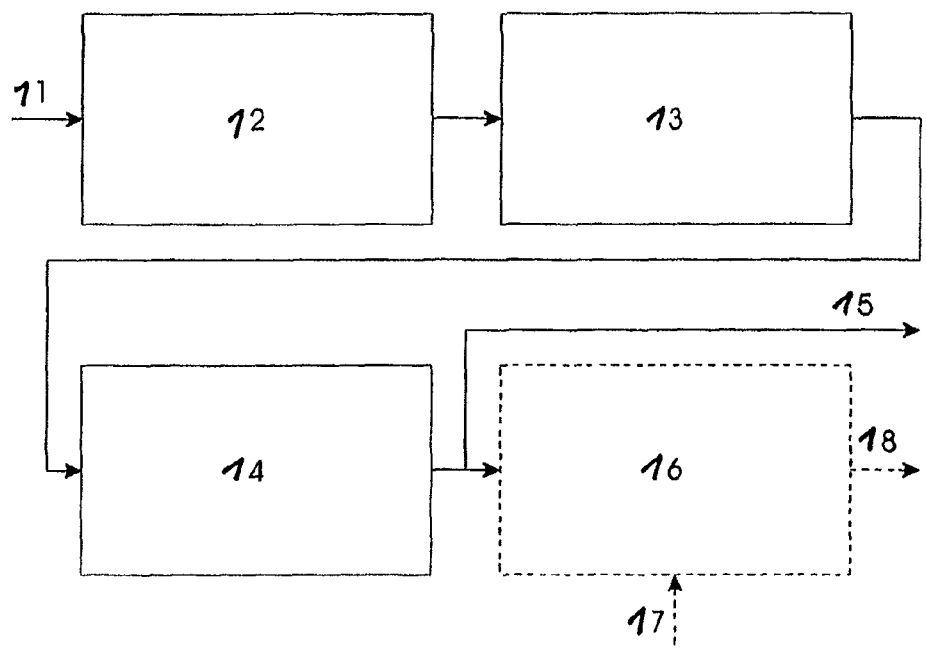
FIG. 1 shows a block diagram of a device for creating a parameterized statistical volume model.

Calculation of a Statistical Volume Model from Example Data Sets

Calculation of the statistical volume model requires example volume data sets Vj (j=1 ... n) which represent all objects of the same object class. This primarily involves CT voxel data sets, whereby corresponding models may also be created for MR tomographs. The fact that the objects all belong to a common object class means that for at any object point in a data set, a point may be identified in another data set which represents a corresponding object feature. These correspondences are identified in a first step; this step is generally referred to as registration of the model. This may be performed manually by designating corresponding points in the example data sets and interpolating the intermediate point positions, but may also be performed by automatic methods (see D. L. Collins, P. Neelin, T. M. Peters, and A. C. Evans, "Automatic 3D intersubject registration of MR volumetric data in standardized Talairach space," Journal of Computer Assisted Tomography, Vol. 18, pages 192-205 and, J. Modersitzki, Numerical Methods for Image Registration. Numerical Mathematics and Scientific Computation. Oxford University Press (2004) for example).

From each example data set a vector $\tilde{B}_j$ is calculated which completely describes the data set, and which is referred to below as an example vector. The first of these example vectors $\tilde{B}_1$ may be generated, for example, by writing in succession the voxel intensity as vector components for each voxel x, y, and z position for the first of the example data sets, whereby the number of components of the vector corresponds to four times the number of voxels. For all further example data sets, the example vectors are formed by determining for each voxel of the first example data set the corresponding voxel of the further example data set which is known based on the registration, and whose x, y, and z position and voxel intensity are written in succession as vector components. Vectors generated in this manner may then be linearly combined. The linear combinations represent new volume data sets composed of positions and intensities. Routinely scanned voxel data sets may be generated from such linear combinations by interpolation and rescanning.

The arbitrariness in the assignment of the example vector components to the voxels of the arbitrarily selected first example data set may be eliminated by repeating the calculation process, and in the second pass, instead of the arbitrarily selected first example data sets using a voxel data set for correspondence calculation and example vector generation which is calculated from the average vector for the example vectors.

In a second step the vector space defined by the example vectors $\tilde{B}_j$ is reparameterized. For this purpose, as described in V. Blanz, T. Vetter. Method and device for the processing of images based on morphable models, EP1039417, for example, a principal component analysis (PCA) may be used. In the PCA, the eigenvectors and eigenvalues of the covariance matrix for the example vectors are calculated after the coordinates of the vectors have been transformed in such a way that the average vector $$B_0 = \frac{1}{n}\sum_{i=1}^{n}\tilde{B}_i$$

of the example vectors is in the original location. It is known that these values may be efficiently calculated for small n without explicit calculation of the multidimensional covariance matrix. Linear combinations of the vectors may then be represented as the sum of the average vector $B_0$ and the eigenvectors $B_i$ of the covariance matrix weighted by parameters $a_i$, thus representing a new basis for the vector space of the linear combinations of the example vectors. Under the assumption that the example data sets represent a maximum (n−1)-dimensional normal distribution, this distribution may be estimated from the example data sets. In this case, the eigenvalues associated with the eigenvectors for the covariance matrix represent the variance of the projection of the transformed example vectors onto the associated eigenvectors, and are used for calculating the probability of their occurrence for specific parameter combinations.

If the example objects are not identically positioned and aligned during the imaging, before carrying out the principal component analysis it is practical to rotate and shift the position coordinates contained in the example vectors in such a way that the position and alignment of the example objects have the best possible match. For the described invention it is immaterial whether this is performed manually or by use of automatic methods, such as fitting of moments. If an observed object is composed of multiple parts of objects which may be moved relative to one another (such as multiple bones connected by joints, for example), this alignment should be carried out separately for the parts of objects. The parameters for this alignment transformation (rotational angle and displacement vectors, for example) may also be treated as vectors which describe the position and alignment of an object or parts of objects, and whose linear combinations likewise form a vector space which may also be reparametrized using linear or nonlinear techniques such as PCA or kernel PCA, for example. The purpose of reparametrization, which may also be performed separately for parts of objects, is the determination of parameters which are able to describe the combinations of the example vectors, but in such a way that these parameters may be ordered according to their importance. In PCA the importance of a parameter may be defined by the average quadratic error which occurs when, during the description of the example vectors, the corresponding parameter is omitted in the coordinate system specified by the PCA. Parameters for which the omission does not produce errors in the imaging of the example vectors may be disregarded. The remaining parameters provide redundancy-free imaging of the example vectors and, when these parameters represent the totality of the volume data sets of an object class well, also provide a low-redundancy imaging possibility for volume data sets of any given new object from the observed object class.

When a statistical model is obtained in this manner, any given combinations of the original example data sets may be generated by adjusting the corresponding parameters. The resulting data sets may be visually displayed by using known volume visual display methods. For example, by integration along the radiation lines emanating from a virtual X-ray radiation source it is very easy to calculate from a CT data set an image which corresponds to a standard X-ray picture.

Calculation of a Volume Model from an X-Ray Picture

An important object which may be achieved by the described invention is the calculation of a volume model from a simple X-ray picture. This is performed as follows:

a) The statistical parameterized volume model is initialized in such a way that the average object is represented. The parameterization is generally selected such that the average object is represented so that all parameters $a_i$ have the value 0. Alternatively, an initial parameter set may be set manually.

b) A virtual X-ray picture is generated from this model using the set parameters $a_i$. The imaging parameters (position of the radiation source and position and alignment of the imaging plane) should be selected similarly as for the standard X-ray picture to be analyzed.

c) The virtually generated X-ray picture is compared to the actual, standard X-ray picture. The sum of the squares of the intensity differences, for example, may be used as a measure of comparison.

d) The match between the virtually generated and the actual X-ray pictures is then improved in an iterative manner by repeatedly performing steps 2 and 3, using modified model parameters $a_i$ and visual display parameters (positions of imaging plane and radiation source). Different numerical standard optimization techniques, such as different hierarchical gradient-based methods, simulated annealing, or the simplex method (James C. Spall, Introduction to Stochastic Search and Optimization, ISBN: 0471330523, Wiley-Interscience, 2003), for example, may be used for adjusting the parameters.

This procedure corresponds to an analysis-by-synthesis method as is known, for example, for the analysis of two-dimensional images (A. Schilling, Introduction to Analysis by Synthesis Methods, in: H. Bülthoff, H. Mallot, R. Ulrich, F. Wichmann (Ed.), Proceedings of TWK05: 8th Tübingen Perception Conference, February 2005, Symposium 1 Symposium 1 [sic]: Analysis by Synthesis Methods in Computer Vision and Perception, 2005).

The result of the method is a set of model parameters which characterize the specialized volume model which may be imaged by use of the statistical parameterized volume model which best fits the actual X-ray picture being analyzed. This model may then be imaged using standard visual display techniques; for example, the model may be observed from all sides. The method may be improved by using two or more X-ray pictures instead of a single actual X-ray picture. In the analysis phase, the model must then be modified in such a way that both pictures match the corresponding virtual pictures. To this end, for example, the sum of the squares of the intensity differences between each of the observed recorded images and the calculated image corresponding thereto may be used as a measure of comparison in step 3. The remaining images are unchanged.

In principle, by use of the statistical model it is possible to calculate the most plausible model based on the example data sets which has resulted in specific image recordings. If a match is not obtained in specific image regions, the reason is that no model which may be represented as a combination of the example data is able to generate an image which corresponds to the recorded image. Regions showing great differences may be marked in color, for example, to represent conditions that deviate from normal. The same applies when individual model parameters assume values which lie far outside the variance specified by the example data.

Use of multimodal example data sets for the calculation provides further applications for analyzing recorded data. If the example data set contains various MR data, for example, in addition to CT data, not only it is possible to specify from an X-ray picture a CT set which matches this X-ray picture, but the most plausible MR data which match same are also automatically available.

The analytical method described for X-ray pictures may be used for standard X-ray pictures as well as for all representations which may be calculated from the parameterized model. Thus, instead of an X-ray picture an individual CT section may be used. The model which fits is determined in the same manner as described for the X-ray pictures, and represents the model which best matches this section according to the statistics specified by the example data. Another very important application is the analysis of raw data such as recorded in the CT scan. Since images may also be calculated from volume data, high-quality CT images may be calculated even from small quantities of recorded data without performing inverse radon transformation (filtered back-projection). However, it is important to note that the example data sets must exhibit sufficient variation so that the conditions may be correctly represented. If this is not the case, in any event deviation of the measurement data from the data derived from the model may be detected and treated separately.

Analysis of Complete Volume Data Sets

It is also practical to analyze complete volume data sets. This is performed by registration as used in the creation of the statistical model. For linear vector spaces and parameterization by PCA, the parameter determination is particularly easy, and is carried out by simple projection of the resulting vectors onto the main axes determined by PCA and subtraction of the projections of the average vector for the example vectors on these main axes.

If the parameterized statistical model is not a linear model having orthogonal base functions, but instead was created by use of nonlinear parameter reduction techniques, for example, a complete volume data set may also be analyzed using the above-described method for calculating a volume model from an X-ray, and instead of the X-ray picture the complete data set to be analyzed is used. The step of calculating a virtual image may be omitted in this case, since the measured volume data set can be directly compared to the volume data set generated from the model parameters.

If the statistical model is multimodal, the parameters thus determined may also be used to produce the respective other modality; a CT image may be calculated from MR data, and vice versa. However, it must be noted that this image represents only a plausible model, not a measurement. Application in the diagnosis of anomalies is of particular interest, since these are manifested by great contrasts of the measured data from the model data. Using labeled example data, it would even be possible to automatically classify specified groups (sex, age, specific illnesses) by means of the parameter determination for measured data. For such diagnostic purposes, however, other parameterizations would be appropriate; thus, to distinguish two groups (for example, a given illness is/is not present) a discriminant analysis should be performed instead of the principal component analysis.

Device for Creating a Parameterized Statistical Volume Model

FIG. 1 shows by way of example the block diagram of a device for creating a parameterized statistical volume model.

Example voxel data sets $V_j$ (j=1 . . . n) of an object class are loaded via an input port 11 into a memory unit 12 for example voxel data sets. From there, the example voxel data sets are relayed to a processing unit 13 for registration and example vector calculation, where point correspondences between the data sets are determined, and from these correspondences an example vector is then calculated for each example voxel data set.

The average vector $$B_0 = \frac{1}{n}\sum_{i=1}^{n} \tilde{B}_i$$

for all example vectors is then determined, and is subtracted from each example vector. The resulting difference vectors $B_i = \tilde{B}_i = B_0$ are relayed to a processing unit 14 for reparametrization by PCA, where they undergo principal component analysis. This results in a parameterized statistical volume model composed of the vector $P_0 = B_0$ and the eigenvectors $P_i$ of the covariance matrix for the difference vectors, as well as the associated eigenvalues $v_i$. This model may then be outputted via an output port 15 or relayed to a processing unit 16 for generating a voxel model for specified parameters $a_i$, from which via an input port 17 point inputted parameters $a_i$ and the model vectors $P_i$ are calculated for the sum vector $$V_a = B_0 + \sum_i a_i P_i,$$

which represents a specific volume model defined by the parameters $a_i$. From this sum vector a voxel model is then calculated on a uniform grid by resampling, and the voxel model may be outputted via an output port 18.

Figure 2:
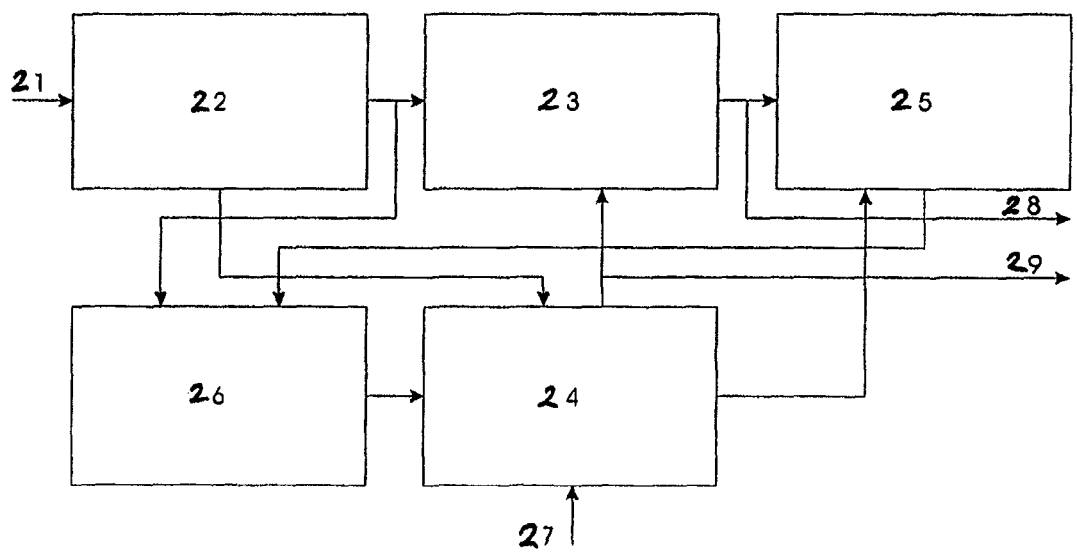
FIG. 2 shows a block diagram of a device for calculating a volume model from one or more simple X-ray pictures or other measurement data sets.

Device for Determining Model Parameters from One or More X-Ray Pictures or Other Measurement Data Sets FIG. 2 shows by way of example the block diagram of a device for calculating a volume model from one or more simple X-ray pictures or other measurement data sets.

A parameterized statistical volume model in the form of the vectors $P_i$ (i=0 . . . n) and the associated variances $v_i$ (i=1 . . . n) as well as the measurement data M, for example in the form of a simple X-ray picture, are loaded via an input port 21 into a memory unit 22 for volume model and measurement data. For the following description it is assumed that the measurement data M represent a simple X-ray picture. The vectors $P_i$ are relayed to a processing unit 23 for generating a voxel model for specified parameters $a_i$. This processing unit is supplied with parameters by a processing unit 24 for optimizing the parameters $a_i$ and the imaging parameters. From these values and the vectors $P_i$ the processing unit calculates a voxel model, which is relayed to a processing unit 25 for generating virtual measurement data M' from a voxel model. In this processing unit, which may be composed of a customary voxel visual display device, for example, and which also receives the imaging parameters from the processing unit 24 for optimizing parameters $a_i$ and the imaging parameters, a virtual measurement data set M', for example a virtual X-ray picture, is generated and relayed to a processing unit 26 for calculating a level of similarity between measurement data M and virtual measurement data M'. In this processing unit the virtual X-ray picture is compared to the recorded X-ray picture from the memory unit 22, which is to be analyzed. This measure of comparison is relayed to the processing unit 24 for optimizing the parameters and the imaging parameters, at which point, corresponding to an optimization algorithm and beginning with an initial parameter set, new parameters $a_i$ and new imaging parameters are iteratively generated until the measure of comparison reaches an extreme value which indicates that the maximum possible match has been obtained between actually recorded and virtually generated measurement data sets. This algorithm may also access the variances stored in the memory unit 22 for volume model and measurement data. The initial parameters $a_i$ are either set standard values (0, for example), or alternatively they may be inputted via an input port 27. The initial imaging parameters should correspond to the recording parameters of the measurement data, and are likewise inputted via the input port 27. With multiple sets of imaging parameters, the device may also be used for analyzing multiple X-ray pictures of an object simultaneously.

When the iteration has concluded, the voxel model calculated from the optimized parameters is available at an output port 28, and may be visually displayed using standard visual display methods for voxel models. A device may be used for this visual display which corresponds to the processing unit 25 for generating virtual measurement data M' from a voxel model.

At an output port 29 the optimized model parameters are available, which represent the calculated optimized model very compactly and may also be used to determine the plausibility of the calculated model by use of the probability distribution specified by the statistical model.

Figure 3:
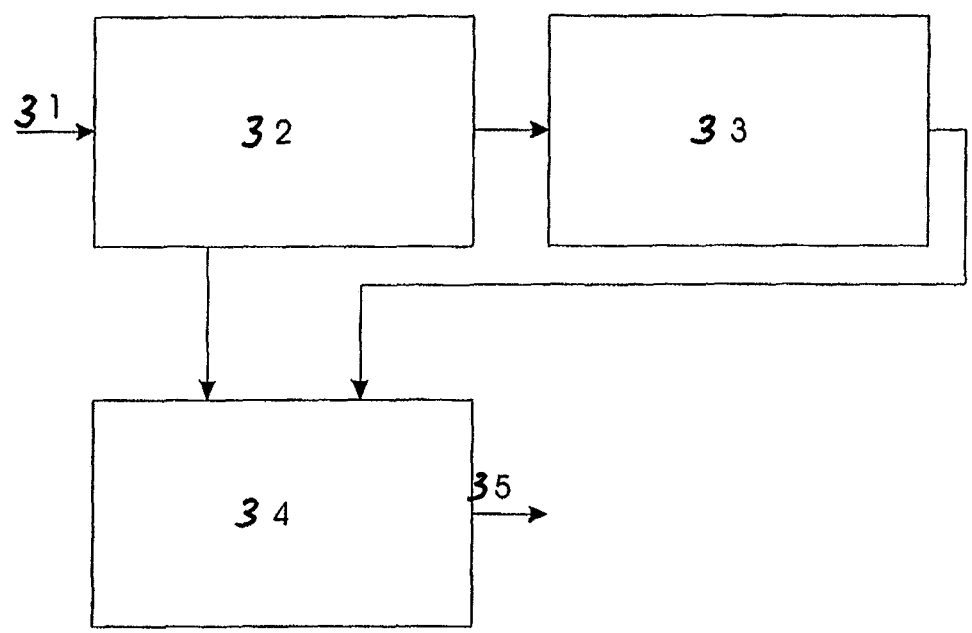
FIG. 3 shows a block diagram of a device for analyzing the model parameters of a parameterized statistical volume model, using orthogonal base vectors from a complete measured data set.

Device for Analyzing the Model Parameters of a Parameterized Statistical Volume Model Having Orthogonal Base Functions from a Measured Complete Data Set FIG. 3 shows by way of example the block diagram of a device for analyzing the model parameters of a parameterized statistical volume model having orthogonal base functions from a measured complete data set.

A parameterized statistical volume model in the form of the orthogonal normalized vectors $P_i$ (i=0 . . . n) in addition to the measured complete volume data set K is loaded via an input port 31 into a memory unit 32 for volume model and measurement data. The measured complete volume data set K is then registered in a processing unit 33 for registration of K, using the volume data set represented by the average vector $P_0$ for the parameterized statistical model. After this registration, the same as for generation of the parameterized statistical model, a vector is calculated from the correspondences and the intensities of K, which represents the complete volume data set to be analyzed. This vector is then transformed into the coordinate system of the parameterized statistical model by subtracting $P_0$. The transformed measurement data vector $V_K$ thus calculated is relayed to a processing unit 34 for calculating the model parameters $a_i$, at which point the parameters $a_i$ are calculated by projection onto the orthonormal base vectors $P_i$ of the parameterized statistical volume model. The parameters $a_i$ thus calculated are then outputted via an output port 35.

In summary, the described method is used for processing data from an object, which has been extracted using imaging methods such as MR tomography, CT, or simple X-ray pictures, by adjusting a parameterized statistical volume model from example volume data sets or example voxel data sets, and adapting the model parameters to the extracted data. The parameterized statistical volume model is obtained from example voxel data sets by manually or automatically registering the volume or voxel data sets, storing the correspondences as multidimensional vectors, and subsequent parameter reduction. The example voxel data sets may contain semantic supplementary information, such as that generated by manual segmentation, for example. The model parameters are adapted to the data to be processed which are extracted by imaging methods by use of analysis-by-synthesis methods. The result is a volume model of the recorded object, based on the example data sets, which may be visually displayed using standard methods. Examples of applications include creation of a three-dimensional volume model from one or more individual X-ray pictures, or also automatic detection of unusual structures by comparing the data calculated from the statistical model with the recorded volume data.

Refinements

The above-described methods and devices may be refined in various respects. For example, machine learning may be used for determining initial parameter sets in the analysis of data in a manner similar to that in A. Schilling, Introduction to Analysis by Synthesis Methods, in: H. Bülthoff, H. Mallot, R.

Ulrich, F. Wichmann (Ed.), Proceedings of TWK05: 8th Tübingen Perception Conference, February 2005, Symposium 1 Symposium 1 [sic]: Analysis by Synthesis Methods in Computer Vision and Perception, 2005 and Cris Curio. Analysis by Synthesis for Human Pose Tracking: Merging View-Based and Model-Based Approaches, in: H. Bülthoff, H. Mallot, R. Ulrich, F. Wichmann (Ed.), Proceedings of TWK05: 8th Tübingen Perception Conference, February 2005, Symposium 1: Analysis by Synthesis Methods in Computer Vision and Perception, 2005.

The invention claimed is:

1. A method for visually displaying and/or evaluating measurement data from imaging methods, the method comprising the acts of:
   a) calculating a parameterized statistical model for voxel data from multiple registered example voxel data sets that map a sufficient number of sufficiently different corporeal objects of an identical object class;
   b) carrying out at least one imaging method on a object to be examined of the object class in order to extract actual measurement data, wherein the object to be examined is a new object, which is not contained in the example voxel data sets;
   c) adjusting a set of model parameters of the parameterized statistical model;
   d) determining a difference between the actual measurement data and the parameterized statistical model;
   e) repeating steps c) and d) while changing the model parameters until the difference between the actual measurement data and the parameterized statistical model is minimal, and
   f) visually displaying and/or evaluating the parameterized statistical model.

2. The method according to claim 1, further comprising the acts of:
   calculating virtual measurement data from the parameterized statistical model after the adjusting act; and
   determining the difference between the actual measurement data and the parameterized statistical model by determining a difference between the actual measurement data and the virtual measurement data.

3. The method according to claim 1, wherein the example voxel data sets are extracted from CT and/or MR voxel data.

4. The method according to claim 2, wherein the example voxel data sets are extracted from CT and/or MR voxel data.

5. The method according to claim 1, wherein the actual measurement data are extracted on the basis of one or more 2d X-ray pictures.

6. The method according to claim 2, wherein the actual measurement data are extracted on the basis of one or more 2d X-ray pictures.

7. The method according to claim 3, wherein the actual measurement data are extracted on the basis of one or more 2d X-ray pictures.

8. The method according to claim 1, wherein the actual measurement data are extracted from not yet back-projected data from one or more CT and/or MR images.

9. The method according to claim 2, wherein the actual measurement data are extracted from not yet back-projected data from one or more CT and/or MR images.

10. The method according to claim 3, wherein the actual measurement data are extracted from not yet back-projected data from one or more CT and/or MR images.

11. The method according to claim 1, wherein the actual measurement data are extracted from voxel data.

12. The method according to claim 2, wherein the actual measurement data are extracted from voxel data.

13. The method according to claim 3, wherein the actual measurement data are extracted from voxel data.

14. The method according to claim 11, wherein from the parameterized statistical model, a reference voxel data set is calculated which registers the measurement data with the reference voxel data set, and model parameters are calculated which best represent the model which matches the measurement data.

15. The method according to claim 12, wherein from the parameterized statistical model, a reference voxel data set is calculated which registers the measurement data with the reference voxel data set, and model parameters are calculated which best represent the model which matches the measurement data.

16. The method according to claim 13, wherein from the parameterized statistical model, a reference voxel data set is calculated which registers the measurement data with the reference voxel data set, and model parameters are calculated which best represent the model which matches the measurement data.

17. The method according to claim 1, wherein the parameterized statistical model is obtained from a linear combination of example vectors, a respective example vector being assigned to an associated example voxel data set, and components of the respective example vector describing the position and intensity of volume elements of the associated example voxel data set.

18. The method according to claim 17, wherein a vector space defined by the example vectors is reparameterized.

19. The method according to claim 1, wherein the evaluation of the parameterized statistical model in step f) includes detection of anomalies in the actual measurement data by finding high contrasts to the plausible model data.

20. The method according to claim 2, wherein the evaluation of the parameterized statistical model in step f) includes detection of anomalies in the actual measurement data by finding high contrasts to the plausible model data.

21. The method according to claim 1, wherein the evaluation of the parameterized statistical model in step f) includes automatic classification using the model parameters determined in steps c)-e).

22. The method according to claim 2, wherein the evaluation of the parameterized statistical model in step f) includes automatic classification using the model parameters determined in steps c)-e).

* * * * *